Dec. 25, 1962 R. A. FISCHER 3,070,108
BALANCE DIAPHRAGM REGULATOR VALVE
Filed Aug. 1, 1960 2 Sheets-Sheet 1

INVENTOR:
RICHARD A. FISCHER,
BY J. Thomas Eubanks
Attorney.

Dec. 25, 1962

R. A. FISCHER 3,070,108

BALANCE DIAPHRAGM REGULATOR VALVE

Filed Aug. 1, 1960

INVENTOR:
RICHARD A. FISCHER,
BY
J. Thomas Eubanks
Attorney.

3,070,108
BALANCE DIAPHRAGM REGULATOR VALVE
Richard A. Fischer, Los Angeles, Calif., assignor to The Garrett Corporation, Los Angeles, Calif., a corporation of California
Filed Aug. 1, 1960, Ser. No. 46,589
10 Claims. (Cl. 137—64)

This invention relates generally to devices for automatically regulating flow of fluid and more particularly to devices that regulate the flow of fluid from a high pressure source to a point of demand or use.

The simplicity and positiveness of the operation of the invention makes it particularly well adapted for use in respiratory devices, pressure regulators, or other similar types of flow control valves, but it is to be understood that the utility of the invention is not limited thereto.

One of the objects of the present invention is to provide a flow regulator of the type referred to that is particularly well suited to installations where inlet fluids from a high pressure source must be controlled.

A further object of the invention is to provide a flow regulator of the type referred to having a valve comprising flexible members proportioned and arranged so that the forces created by the high pressure inlet fluid are balanced.

A still further object of the invention is to provide a flow regulator that is operated by relatively slight pressure variations.

Another object of the invention is to provide a flow regulator having a simple means of effecting zero leakage.

Still another object of the invention is to provide a flow regulator whose component parts do not require critical tolerances or fits thus contributing to and satisfying the additional objects of minimum machining, rapid production and low cost.

Other and further objects of the present invention will become apparent from the disclosures in the following detailed specification, appended claims, and accompanying drawing, wherein:

Figure 1:
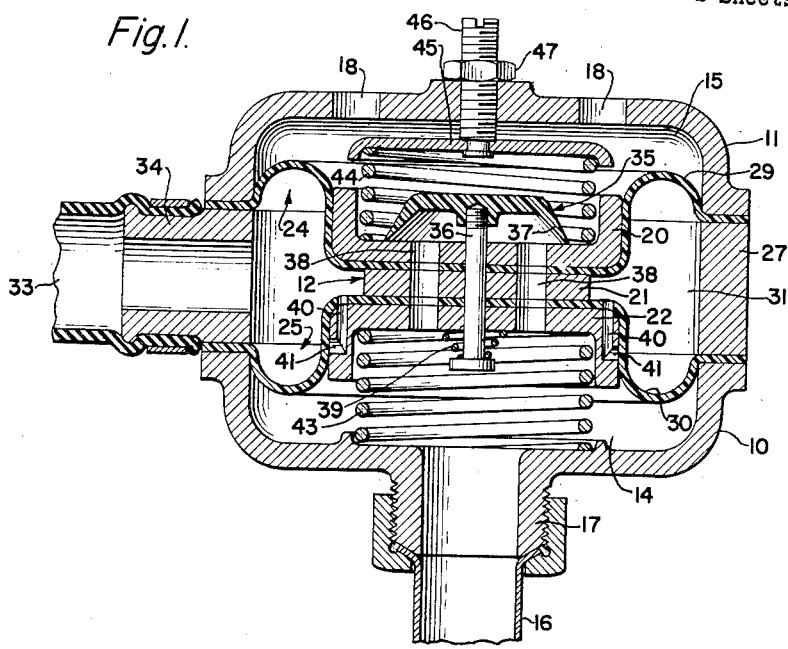
FIGURE 1 is a sectional view taken centrally through a respiratory device embodying one form of the present invention.
Figure 2:
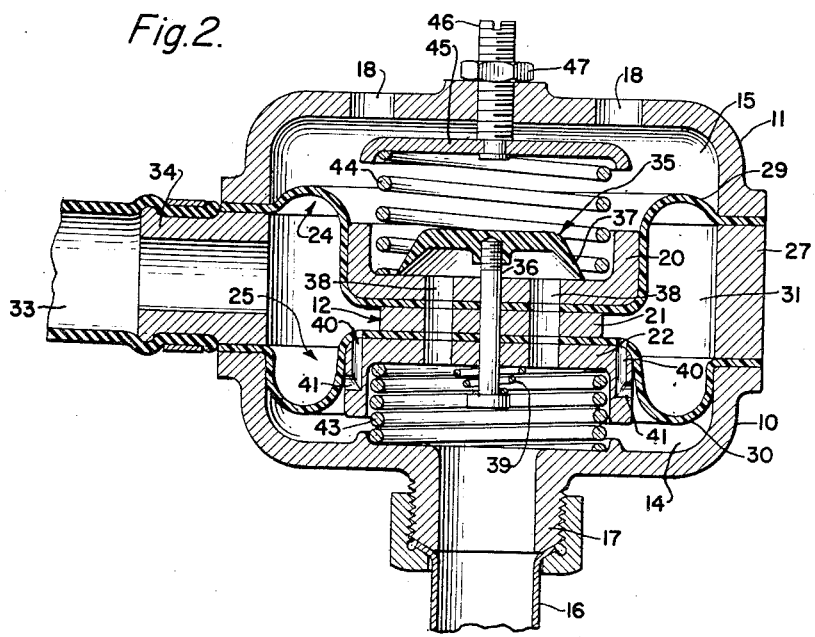
FIGURE 2 is a sectional view similar to FIGURE 1 but illustrating the respiratory device of FIGURE 1 in the position assumed during inhalation.

Referring to the drawings, in which like numerals identify similar parts throughout, the invention is illustrated in FIGURE 1 and FIGURE 2 of the drawings in the form of a respiratory device having a body 10 and a cap 11. A respiration responsive movable wall indicated generally at 12 is secured between the body and the cap in the manner hereinafter described to provide a chamber 14 within the body 10 and a chamber 15 within the cap 11.

The respiratory device is adapted for use in conjunction with a face mask or a suitable mouthpiece, not shown, and the chamber 14 communicates with such point of use by means of a conduit 16 secured to an outlet 17 formed in the body 10. In the embodiment of the invention shown in FIGURE 1 and FIGURE 2, chamber 15 communicates with the ambient fluid medium which is admitted to the interior of the chamber through spaced radial openings 18 provided in the cap 11.

The respiration responsive movable wall 12 includes an upper plate 20, a central plate 21, and a lower plate 22 secured together by fastening means such as rivets, not shown. The inner periphery or central portion of a diaphragm 24 is retained between the plates 20 and 21 and the central portion of a diaphragm 25 is similarly retained between the plates 21 and 22. The outer periphery of the diaphragm 24 is clamped between the wall of the cap 11 and an annular ring 27 by suitable fastening elements, not shown, and the same or similar fastening elements may be utilized to clamp the outer periphery of diaphragm 25 between the annular ring 27 and the wall of the body 10. Between the plates and the annular ring 27, the diaphragms 24 and 25 respectively have oppositely extending arcuate convolutions 29 and 30 forming a chamber 31 around the periphery of the movable wall 12.

The chamber 31 is connected with a supply of breathable gas such as compressed air or oxygen, not shown, by means of a conduit 33 secured to an inlet 34 formed in the annular ring 27. The arcuate convolutions 29 and 30 are made equal in area so that the forces of the high pressure inlet supply acting on the convolutions are balanced. When the wall 12 moves in response to a pressure differential acting across the wall, the convolutions roll on the inner walls of the body 10 and the cap 11, and the outer perimeters of the plates 20 and 22.

An exhalation valve indicated generally at 35 is positioned in the approximate center of the movable wall 12 by means of a pin 36 which slides freely in a drilling in the movable wall. The exhalation valve 35 includes a valve member 37 adapted to normally occlude a plurality of apertures 38 arranged in spaced radial relationship about the pin 36. A spring 39 is positioned about the pin 36 and co-acts between the plate 22 and the head of the pin to urge the valve member 37 in a closing direction.

A plurality of passages 40 formed in plate 22 connect chamber 31 with the chamber 14. As shown in FIGURE 1, the ends 41 of the passages 40 are occluded by the arcuate convolution 30 of the diaphragm 25 when the pressures on the opposite sides of the movable wall 12 are balanced, the high pressure gas in chamber 31 holding the convolution 30 in sealing engagement with the ends 41 of the passages 40.

In use, inhalation will produce a reduction in the pressure within the chamber 14, causing the movable wall 12 to move toward the chamber 14, and the convolution 30 will roll on the plate 22 and uncover the ends 41 of the passages 40, as shown in FIGURE 2. The breathable gas then will flow from the source through the chamber 31 and passages 40 into chamber 14, and thence through the conduit 16 to the point of use. Upon exhalation, the exhalation products will be carried through conduit 16 to the chamber 14 and pressure in chamber 14 will increase causing the movable wall 12 to move upwardly so that the convolution 30 of the diaphragm 25 will roll on the plate 22 and again seal the ends 41 of the passages 40. When the pressure within chamber 14 is increased above the pressure of the ambient fluid in chamber 15, the movable wall 12 will seat against a stop (not shown) and the pressure acting on the underside of the valve member 37 will move the valve member upwardly away from the plate 20 to permit a flow of exhalation products from the chamber 14 through the apertures 38 into the chamber 15 and thence out into the surrounding fluid medium through the openings 18. When the pressures in chamber 14 and chamber 15 are equalized the spring 39 will move the exhalation valve member 37 downwardly to cover the apertures 38 and the movable wall 12 will be centrally positioned as shown in FIGURE 1. The inhalation-exhalation cycle may then be repeated until the supply of breathable gas is expended.

Adjustable means comprising a spring 43 disposed in chamber 14 between the lower side of the movable wall 12 and the inner wall of the body 10, and a spring 44 disposed in chamber 15 between the upper side of the movable wall 12 and a spring retainer 45 are provided to center the movable wall when the pressures on the opposite sides thereof are equalized. If desired, the spring retainer 45 may be positioned so that a load is applied to one side of the movable wall and a screw 46 and a lock nut 47 are provided to maintain the retainer 45 in adjusted position.

Figure 3:
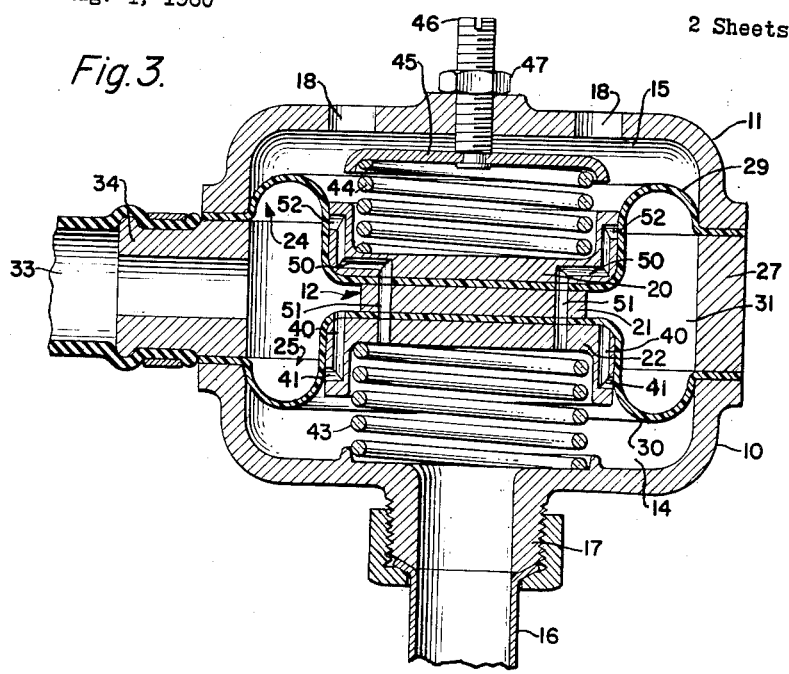
FIGURE 3 is a sectional view of a respiratory device of the type shown in FIGURE 1 but illustrating a modified form of exhalation valve.

The respiratory device illustrated in FIGURE 3 of the drawings is identical to the respiratory device shown in FIGURE 1 except for the exhalation valve. The modified form of the exhalation valve in FIGURE 3 comprises a plurality of passageways 50 formed in the movable wall 12 and adapted to conduct fluid from chamber 14 to chamber 15 as hereinafter noted. The ends 51 of the passageways 50 communicate at all times with the chamber 14 while the ends 52 of the passageways are occluded and sealed by the arcuate convolution 29 when the pressures on the opposite sides of the movable wall 12 are balanced or when the movable wall 12 is positioned as shown in FIGURE 2 in response to inhalation.

In operation, when the pressures on the opposite sides of the movable wall 12 in FIGURE 3 are balanced, the ends 52 of the passageways 50 are occluded by the arcuate convolution 29 and, simultaneously, the ends 41 of the passages 40 are occluded by the arcuate convolution 30 of the diaphragm 24, the high pressure fluid in the chamber 31 holding the convolutions in sealing engagement with the above noted ends 41 and 52. Inhalation will produce a reduction in the pressure within the chamber 14 and cause the movable wall 12 to move downwardly toward the chamber 14. As the movable wall moves in the downwardly direction, the convolution 29 will continue to seal off the ends 52 of the passageways 50 but the convolution 30 will roll on the plate 22 and uncover the ends 41 of the passages 40. The breathable gas will then flow from the source through the chamber 31 and passages 40 into chamber 14, and thence through the conduit 16 to the point of use.

Upon exhalation, the exhalation products will be carried through conduit 16 to the chamber 14 and pressure in chamber 14 will increase causing the movable wall 12 to move in the upwardly direction. When the pressures on opposite sides of the movable wall 12 are equal, the ends 41 of the passages 40 will be occluded by the convolution 30 and the ends 52 of the passageways 50 will be occluded by the convolution 29. Thus during this phase of operation there will be no flow through either the passages 40 or the passageways 50.

As the exhalation continues the pressure within the chamber 14 will continue to increase. When the pressure within the chamber 14 exceeds the pressure of the ambient fluid in the chamber 15 the movable wall 12 will be moved toward the chamber 15 and the convolution 29 will uncover the ends 52 of the passageways 50 to permit flow of the exhalation products from the chamber 14 through the passageways 50 into the chamber 15 and thence out into the surrounding fluid medium through the openings 18.

During this phase of the operation the convolution 30 will seal off the ends 41 of the passages 40 and prevent flow of the pressurized gas therethrough. The inhalation-exhalation cycle may then be repeated until the supply of breathable gas is expended.

Figure 4:
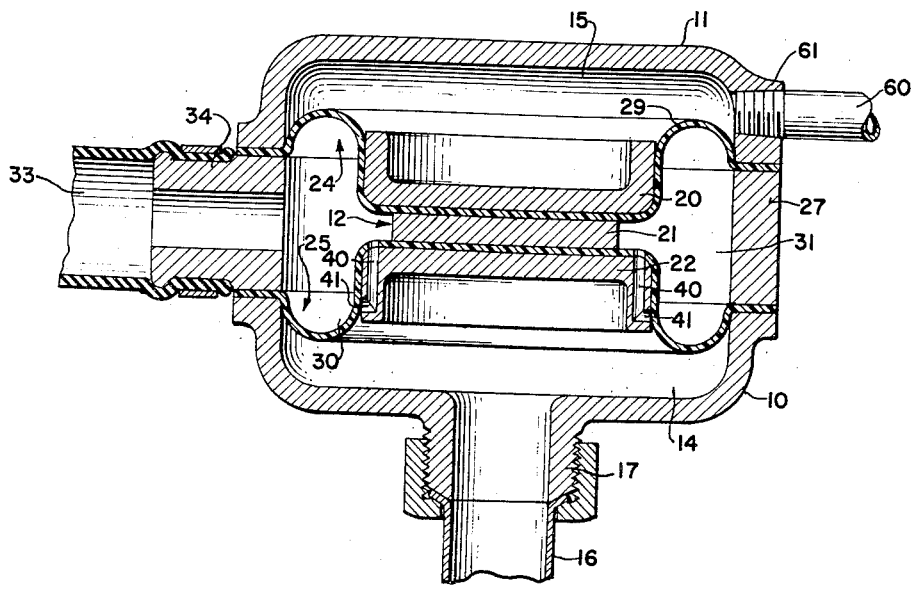
FIGURE 4 is a sectional view taken centrally through a pressure regulator showing another form of the present invention.

FIGURE 4 shows a modified form of the invention embodied in a device such as a pressure regulator. In this form of the invention there is no exhalation valve and the chamber 15, rather than communicating with the ambient atmosphere through a plurality of holes disposed in the cap 11, is connected with a regulated reference pressure, not shown, by means of a conduit 60 secured to an outlet 61 formed in the cap 11. The conduit 33 in this form of the invention is connected with a source of compressed fluid and the conduit 16 is connected to an enclosure wherein the pressure is to be maintained equal to the reference pressure. The enclosure may, for example, be a compartment or a duct wherein the pressure of the fluid normally would diminish due to leakage or use, and the device shown in FIGURE 4 is utilized to maintain the pressure in the enclosure equal to the reference pressure.

In operation, chamber 15 is subjected at all times to the reference pressure which is introduced through the conduit 60. When the pressure of the fluid in the enclosure wherein the pressure is to be maintained falls below the pressure of the reference pressure in chamber 15, the resultant reduction in pressure in chamber 14 will create a pressure differential across the movable wall 12 and cause the wall to move toward the chamber 14. The convolution 30 will then uncover the ends 41 of the passages 40 and fluid will flow from the pressure source through the chamber 31 and the passages 40 into the chamber 14 and thence to the enclosure. When the pressure in the enclosure, and hence chamber 14, becomes equal to the reference pressure in chamber 15, the movable wall 12 will be centered and convolution 30 will seal the ends 41 of the passages 40 and shut off the flow of fluid to the enclosure.

As noted above, the arcuate convolutions 29 and 30 are made equal in area so that the forces of the high pressure inlet supply acting on the convolutions are balanced.

I claim:

1. A fluid flow regulating device comprising: a body having a first chamber adapted for connection to a point of fluid demand and a second chamber adapted for connection to a reference pressure; a pressure responsive movable wall in said body exposed on one side to the pressure in said first chamber and on the other side to said reference pressure, said movable wall having flexible means secured to said body and forming a peripheral chamber disposed to be connected with a source of fluid under pressure; passage means for conducting said fluid under pressure to said first chamber, said flexible means occluding said passage means under conditions of zero demand, the flexible means being disposed to unblock said passage means in response to a reduction in the pressure in said first chamber below the pressure of said reference pressure; and a valve member carried by and normally closing an opening in said movable wall connecting said first chamber with said second chamber, said valve member being movable toward an open position when the pressure in said first chamber exceeds the reference pressure.

2. A fluid flow regulating device comprising: a body having a chamber adapted for connection to a point of fluid demand; a pressure responsive movable wall forming one side of said chamber, one side of said movable wall being exposed to the pressure in said chamber, the other side being exposed to the pressure of the surrounding fluid medium, said movable wall having flexible means secured to said body and forming a peripheral chamber disposed to be connected with a source of fluid under pressure; passage means for conducting said fluid under pressure to said chamber, said flexible means occluding said passage means under conditions of zero demand, the flexible means being disposed to unblock said passage means in response to a reduction in the pressure in said chamber below the pressure of said surrounding fluid medium; and a valve member carried by and normally closing an opening in said movable wall connecting said chamber with the surrounding fluid medium, said valve member being movable toward an open position when the pressure in said chamber exceeds the pressure of the surrounding fluid medium.

3. A fluid flow regulating device comprising: a body having a chamber adapted for connection to a point of fluid demand; a pressure responsive movable wall forming one side of said chamber, one side of said movable wall being exposed to the pressure in said chamber, the other side being exposed to the pressure of the surrounding fluid medium, said movable wall having flexible means secured to said body and forming a peripheral chamber disposed to be connected with a source of fluid under pressure; a plurality of passages disposed in said movable wall for conducting said fluid under pressure to said chamber, said flexible means occluding one end of said passages under conditions of zero demand, the flexible means being disposed to unblock said passages in response to a reduction in the pressure in said chamber below the pressure of said surrounding fluid medium; and a valve member carried by and normally closing an opening in said movable wall connecting said chamber with the surrounding fluid medium, said valve member being movable toward an open position when the pressure in said chamber exceeds the pressure of the surrounding fluid medium.

4. A fluid flow regulating device comprising: a body having a chamber adapted for connection to a point of fluid demand; a pressure responsive movable wall forming one side of said chamber, said movable wall having a rigid central portion and a pair of flexible member forming a peripheral chamber secured to said body and disposed to be connected with a source of fluid under pressure, the movable wall being exposed on one side to the pressure in said chamber and on the other side to the pressure of the surrounding fluid medium; a plurality of passages disposed in the rigid central portion of said movable wall for conducting said fluid under pressure to said chamber, one of said flexible members occluding one end of said passages under conditions of zero demand, the said one flexible member being disposed to unblock said passages in response to a reduction in the pressure in said chamber below the pressure of said surrounding fluid medium; and a valve member carried by and normally closing an opening in said movable wall connecting said chamber with the surrounding fluid medium, said valve member being movable toward an open position when the pressure in said chamber exceeds the pressure of the surrounding fluid medium.

5. A fluid flow regulating device comprising: a body having a chamber adapted for connection to a point of fluid demand; a pressure responsive movable wall forming one side of said chamber, one side of said movable wall being exposed to the pressure in said chamber, the other side being exposed to the pressure of the surrounding fluid medium, said movable wall having a rigid central portion and a pair of flexible annular members having oppositely disposed convoluted portions secured to said body and forming a peripheral chamber disposed to be connected with a source of fluid under pressure, the convoluted portions of said flexible members being equal in area and arranged so that the forces of the fluid in the peripheral chamber are balanced; a plurality of passages disposed in the rigid central portion of said movable wall for conducting said fluid under pressure to said chamber, one of said flexible members occluding one end of said passages under conditions of zero demand, the said one flexible member being disposed to unblock said passages in response to a reduction in the pressure in said chamber below the pressure of the surrounding fluid medium, and a valve member carried by and normally closing an opening in said movable wall connecting said chamber with the surrounding fluid medium, said valve member being movable toward an open position when the pressure in said chamber exceeds the pressure of the surrounding fluid medium.

6. A fluid flow regulating device comprising: a body having a first chamber adapted for connection to a point of fluid demand and a second chamber adapted for connection with a reference pressure; a pressure responsive movable wall separating said chambers and operating in response to changes in the differential of pressures in said chambers, said movable wall having a rigid central portion and flexible means secured to said body and forming a peripheral chamber disposed to be connected with a source of fluid under pressure; and a plurality of passages disposed in the rigid central portion of said movable wall for conducting said fluid under pressure to said first chamber, said flexible means occluding said passages under conditions of zero demand, the said flexible means being disposed to unblock said passages in response to a reduction in the pressure in said first chamber below the reference pressure in said second chamber.

7. A fluid flow regulating device comprising: a body having a first chamber adapted for connection to a point of fluid demand and a second chamber adapted for connection with a reference pressure; a pressure responsive movable wall separating said chambers and operating in response to changes in the differential of pressures in said chambers, said movable wall having a rigid central portion and a pair of flexible annular members having oppositely disposed convoluted portions, said flexible members being secured to said body and forming a peripheral chamber disposed to be connected with a source of fluid under pressure, the convoluted portions being equal in area and arranged so that the forces of the fluid in the peripheral chamber are balanced; and a plurality of passages disposed in the rigid central portion of said movable wall for conducting said fluid under pressure to said first chamber, said convoluted portions occluding said passages under conditions of zero demand, the said convoluted portions being disposed to unblock said passages in response to a reduction in the pressure in said first chamber below the reference pressure in said second chamber.

8. A fluid flow regulating device comprising: a body having a chamber adapted for connection to a point of fluid demand; a pressure responsive movable wall forming one side of said chamber, one side of said movable wall being exposed to the pressure in said chamber, the other side being exposed to the pressure of the surrounding medium; and passage means in said movable wall for connecting said chamber with a source of high pressure fluid, said movable wall including flexible means co-acting with said passage means for controlling flow of fluid from said high pressure source to said chamber, said flexible means having oppositely disposed convoluted portions proportioned and arranged so that the forces created by the high pressure fluid are balanced.

9. A fluid flow regulating device comprising: a body having a first chamber adapted for connection to a point of fluid demand and a second chamber adapted for connection with a reference pressure; a pressure responsive movable wall separating said chambers and modulating in response to changes in the differential of pressures in said chambers; first passage means in said movable wall for connecting said first chamber with a source of high pressure fluid; second passage means in said movable wall for connecting said first chamber with said second chamber; and occluding means including flexible rolling diaphragms disposed between said movable wall and said body and arranged to control flow of fluid through said first and said second passage means.

10. A fluid flow regulating device comprising: a body having a first chamber adapted for connection to a point of fluid demand and a second chamber adapted for connection with a reference pressure; a pressure responsive movable wall separating said chambers and responsive to changes in the differential of pressures in said chambers; first passage means in said movable wall for connecting said first chamber with a source of high pressure fluid; second passage means in said movable wall for connecting said first chamber with said second chamber; and occluding means including flexible rolling diaphragms disposed between said movable wall and said body and arranged to control flow of fluid through said first and second passage means, said rolling diaphragms having convolutions forming a chamber disposed to be connected with said source of high pressure fluid, said convolutions being proportioned and arranged so that the forces created by said high pressure fluid are balanced.

References Cited in the file of this patent
UNITED STATES PATENTS

| | | |
|---|---|---|
| 2,121,312 | Bicknell | June 21, 1938 |
| 2,490,113 | Champbell | Dec. 6, 1949 |
| 2,663,121 | Ramsey | Dec. 22, 1953 |
| 2,679,863 | Tucker | June 1, 1954 |